United States Patent [19]

Boone

[11] Patent Number: 4,788,774
[45] Date of Patent: Dec. 6, 1988

[54] GOLF CLUB MEASURING APPARATUS
[75] Inventor: David D. Boone, El Toro, Calif.
[73] Assignee: Lynx Golf, Inc., City of Industry, Calif.
[21] Appl. No.: 136,787
[22] Filed: Dec. 22, 1987
[51] Int. Cl.$^4$ ............................................. G01B 5/00
[52] U.S. Cl. ...................................... 33/508; 33/1 N; 33/534
[58] Field of Search ......................... 33/508, 534, 1 N; 273/183 R, 183 D, 163 R, 163 A, 194 A

[56] References Cited
U.S. PATENT DOCUMENTS 2,920,392  1/1960  Stromquist .......................... 33/534 X
4,104,802  8/1978  Johnston ................................ 33/508

Primary Examiner—Harry N. Haroian
Attorney, Agent, or Firm—Leonard Tachner

[57] ABSTRACT

A measurement apparatus primarily for use during the purchase of golf clubs for indicating angle modifications between head and shaft needed to assure zero angle between the sole and the underlying surface for a particular golfer. The apparatus comprises a club simulation member having a shaft and grip of a conventional golf club but terminating at its non-grip end in a yoke member. The yoke member is attached to a hinge bracket which is, in turn, attached to a pointer positioned at a predetermined angle relative to the axis of the shaft. The pointer is positioned within a housing preferably covered by a face of which at least a portion is transparent to permit observation of the angular position of the pointer when the golfer grasps the club simulation member in a ball addressing configuration. The face may also advantageously provide indicia to permit convenient observation of the angle of the pointer which may easily be calibrated to correspond to the angle between the shaft and the underlying surface.

6 Claims, 3 Drawing Sheets

GOLF CLUB MEASURING APPARATUS

BACKGROUND OF THE INVENTION

1. Field of the Invention

The present invention relates generally to accessories for the game of golf and more specifically, to an apparatus for measuring the preferred angle between the golf club shaft and the golf club head sole to suit the individual golfer.

2. Prior Art

It is well known in the sport of golf that when the golfer addresses the ball, the sole line of the golf club head should be parallel to the playing surface. In the event there is a non-zero angle between the sole and the playing surface then depending upon the direction of that angle, either the toe end of the sole or the heel end of the sole of the golf club head will come in contact with the playing surface before the rest of the sole during the stroke. Such unequal surface contact creates a torque of the golf club head at the point of impact with the golf ball. Consequently, the ball tends to curve to the left or the right depending upon the direction of the angle between the sole and the golf playing surface.

In order to remedy this potential detrimental non-zero angle between the sole and the playing surface it is often necessary to provide the golfer with a set of clubs in which the head is positioned at a slightly different angle with respect to the golf club shaft than one finds in standard golf clubs. This necessity commonly arises when the golfer is either significantly shorter, taller or of different posture than the average person or has significantly longer or shorter arms, legs or torso than the average person.

In the prior art known to the applicant, compromising the conventional method for determining whether a golfer needs a non-standard angular relationship between his golf club head and the shaft, one merely permits the golfer to assume his most comfortable ball addressing position with a standard golf club in hand while the golf pro or salesman examines the sole of the golf club head to measure the extent to which the sole is at an angle which is non-zero with respect to the underlying surface. Typically, it is necessary for the golf pro or salesman to stoop down to the surface beneath the golf club head and either measure the angle using a protractor-type instrument or using angular shims which give a rough measure of the deviation from a zero degree angle. Sometimes a mirror is used as a visual aid. Unfortunately, such a prior art method is neither particularly convenient nor particularly accurate in most cases because of the inherent difficulty in measuring small angles so close to the underlying surface. As a result, the prior art method for measuring this angle suffers from the disadvantages of being time-consuming and unreliable. There is therefore an existing need for an apparatus which will permit more accurate and less time-consuming measurement of the angle between the sole of a golf club head and the underlying surface when a golfer positions himself in a ball addressing configuration such as for buying a set of clubs.

SUMMARY OF THE INVENTION

The aforementioned existing need is satisfied by the golf club measurement apparatus of the present invention which comprises a club simulation member having a shaft and grip of a conventional golf club but terminating at its non-grip end in a yoke member. The yoke member is attached to a hinge bracket which is, in turn, attached to a pointer positioned at a predetermined angle relative to the axis of the shaft. The pointer is positioned within a housing preferably covered by a face of which at least a portion is transparent to permit observation of the angular position of the pointer when the golfer grasps the club simulation member in a ball addressing configuration. The face may also advantageously provide indicia to permit convenient observation of the angle of the pointer which may easily be calibrated to correspond to the angle between the shaft and the underlying surface.

Thus for example, a five iron of a standard golf club configuration will provide an angular relationship between the shaft of the club and the underlying surface of 60 degrees. However, if the golfer is either very short or has long arms, the manner in which such golfer holds the club will alter the relationship between the sole and the underlying surface so that the 60 degree angle will be diminished by as much as a few degrees. Simularly, if the golfer has unusually short arms or is unusually tall as compared to the avergage person, he will normally hold a golf club shaft in a position which increases the angle between the shaft and the underlying surface by as much as a few degrees.

The present invention provides an easy and reliable means for readily calibrating the position of the golf club shaft in the address position held by the golfer so that the corresponding position of the pointer indicates the desirable angle between the shaft and the underlying surface in order to keep the sole precisely parallel to the underlying surface. As a result, by using the present invention it becomes unnecessary for an observer to be positioned beneath the golf club head to measure the angle between the sole and the underlying surface. The measurement of this angle is thus more reliable because it is not dependent upon the potentially inaccurate reading of that angle based upon a difficult observing position or upon the use of special protractors or wedges to measure that angle. The present invention is therefore more reliable in measuring accurately the extent to which the angle between the shaft and the ground for a particular individual should be altered by modifying the relative angle between the sole and the shaft in order to keep the sole parallel to the underlying surfaces. In addition, the present invention permits the measurement of this angle to be accomplished in a much more convenient and expedient manner thereby saving the time of the golf pro and the purchaser as well. One significant advantage of the present invention is that it precludes measurement in accuracy due to a visually induced distortion of the club angle that often results when a golfer looks at the club head while trying to assume the most comfortable position.

OBJECTS OF THE INVENTION

It is therefore a principal object of the present invention to provide a golf club measurement apparatus which may be advantageously used for expedient measurement of possible angular deviations from standard golf club configurations for particular golfers.

It is an additional object of the present invention to provide a golf club measurement apparatus which effectively measures the angle between the golf club shaft and the underlying surface for optimum positioning of the golf club head sole relative to the underlying surface for the purchaser of a set of golf clubs.

It is an additional object of the present invention to provide a golf club measurement apparatus which comprises a golf club shaft simulation member hingedly affixed to its lower end to permit selective variation in the elevation angle of he shaft and a pointer having a fixed angular relationship to the simulation member whereby to register an angular measurement corresponding to the preferred angle between the shaft and the underlying support surface to provide the user with a set of golf clubs in which the sole is always parallel to the underlying surface despite variations in the angular variation of the shaft when it is held in a ball addressing position.

BRIEF DESCRIPTION OF THE DRAWINGS

The aforementioned objects and advantages of the present invention as well as additional objects and advantages thereof will be more fully understood hereinafter as a result of a detailed description of a preferred embodiment when taken in conjunction with the following drawings in which.

DETAILED DESCRIPTION OF A PREFERRED EMBODIMENT

Figure 1:
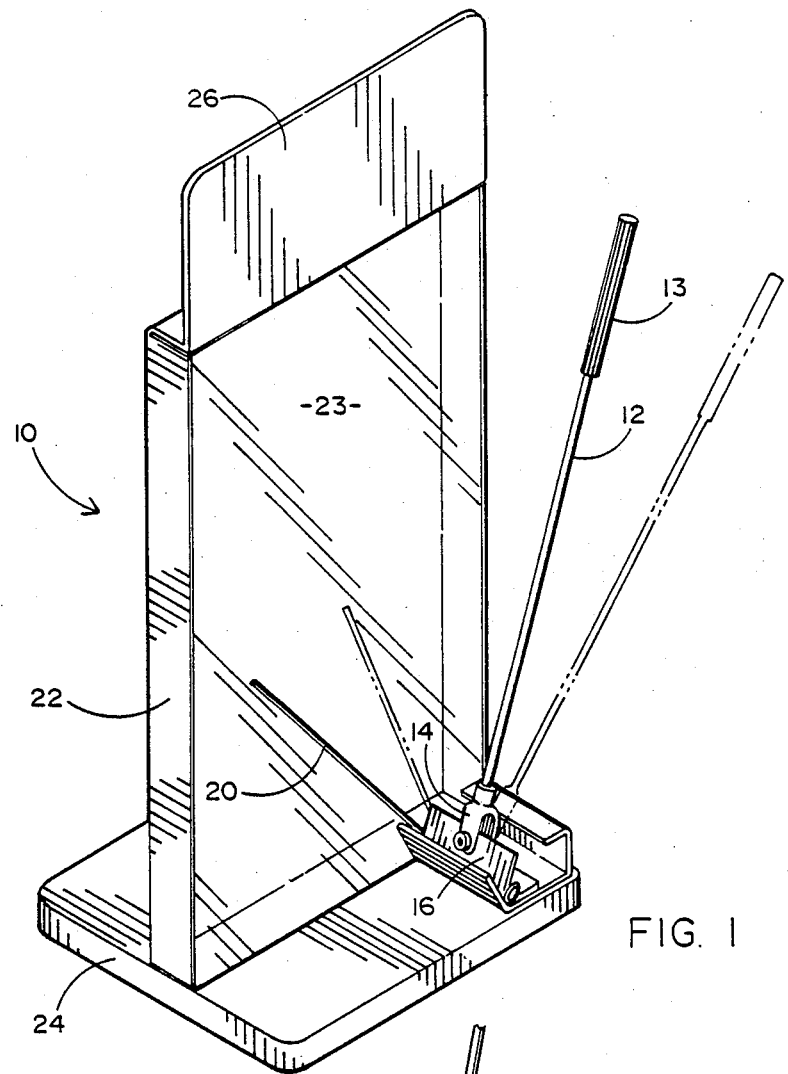
FIG. 1 is an isometric view of the present golf club measurement invention.
Figure 2:
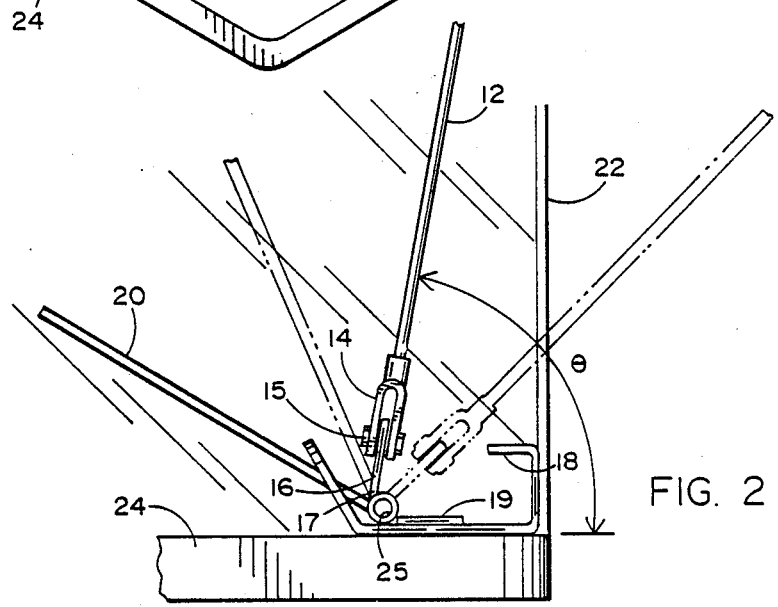
FIG. 2 is a front plan view of the lower portion of the apparatus of the present invention.
Figure 3:
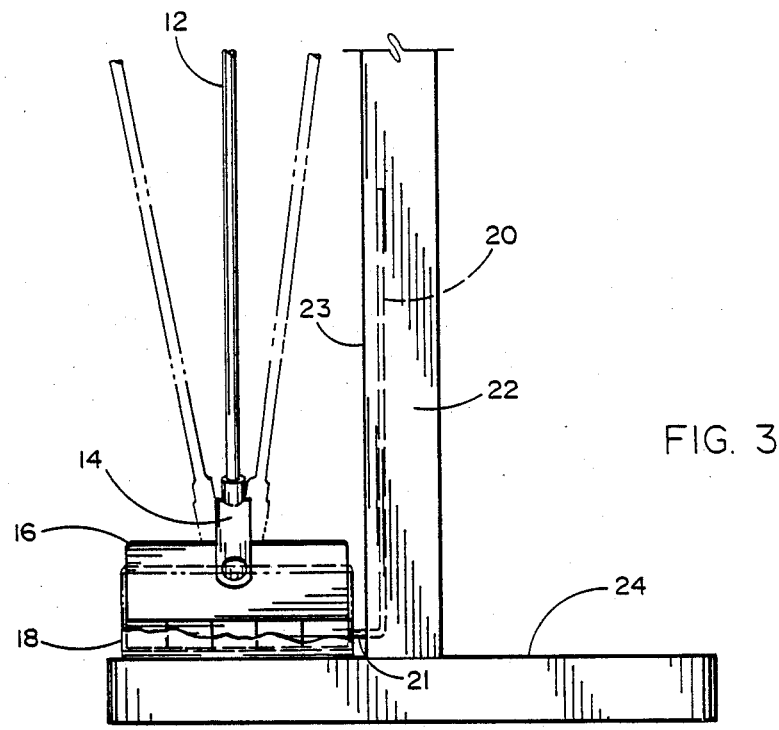
FIG. 3 is a side plan view of the apparatus of the present invention.

Referring to FIGS. 1–3, it will be seen that the golf club measurement apparatus 10 of the present invention comprises a club simulation member 12 having a conventional grip 13 adapted to receive the golfer's hands for holding same in the manner in which the golfer would ordinarily hold a conventional golf club when addressing the ball. The other end of the simulation member 12, that is, the non-grip end, terminates in a yoke 14. Yoke 14 is attached such as by a bolt 15 to a hinge bracket 16. Hinge bracket 16 comprises a rotatable member 17 and a fixed member 19. Members 17 and 19 are interconnected by coaxial hinge 25 seen best in FIG. 2. Hinge bracket 16 is affixed to a limit bracket 18 which is adapted to permit rotation of rotatable member 17 within a limited angular range.

The golf club measurement apparatus 10 also comprises a housing 22 and a base 24 to which the housing is affixed, the base being adapted to support the housing in a vertical configuration relative to the underlying surface beneath the base. Housing 22 comprises a generally planar rectangular member of elongated configuration and having a face 23 which may be made of a transparent material such a plexiglass.

As seen in FIGS. 1–3, the hinge bracket 16 and limit bracket 18 are affixed to the base 24 in close proximity to the face 23 of housing 22. As seen best in FIG. 3, a pointer 20 extends in a generally upward direction inside the housing 22 in close proximity to and parallel to the interior of face 23. A pointer extension 21 forming an integral portion of the pointer 20 and extending at right angles to that portion of the pointer contained within the housing 22, extends through an aperture in the face 23 and connects the pointer 20 to the rotatable member 17 of the hinge bracket 16. Because simulation member 12 and pointer 20 are both connected to the rotatable member 17 of the hinge bracket 16, the angular relation between the simulation member and the pointer remains fixed. Consequently, a change in the elevation angle of the simulation member 12 automatically produces a corresponding change in the elevation angle of pointer 20. In addition, because the face 23 is either entirely transparent or has a transparent portion such as window 30 of FIG. 4, the angular position of pointer 20 may be readily observed in its travel over the likely range of angles corresponding to the ball addressing positions of the club simulation member 12. As shown best in FIG. 1, the golf club measurement apparatus 10 of the present invention may also comprise a header 26 which may be used for cosmetic reasons such as for providing a position for placing a logo or other trademark on the apparatus.

Figure 4:
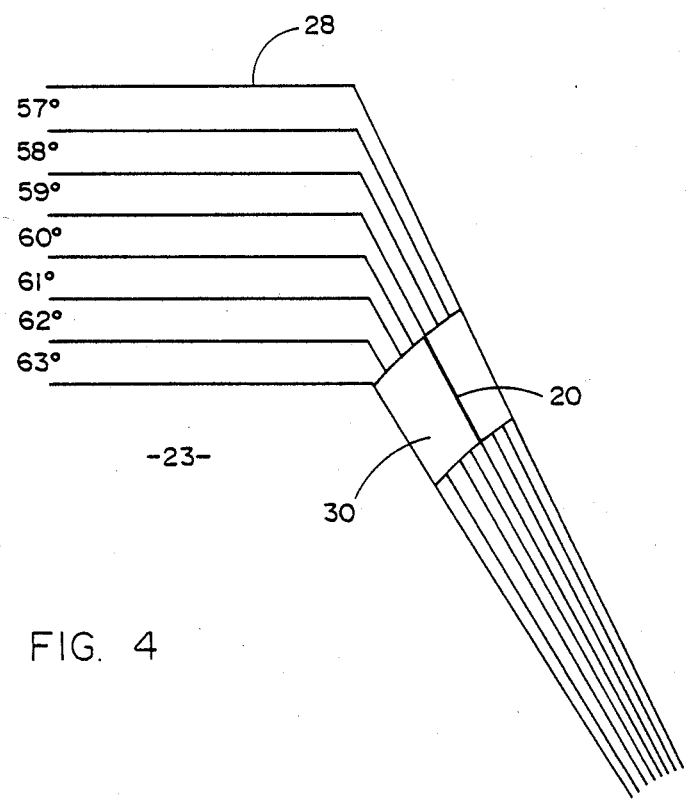
FIG. 4 is an examplary illustration of the indicia and face portion of the present invention.
Figure 5:
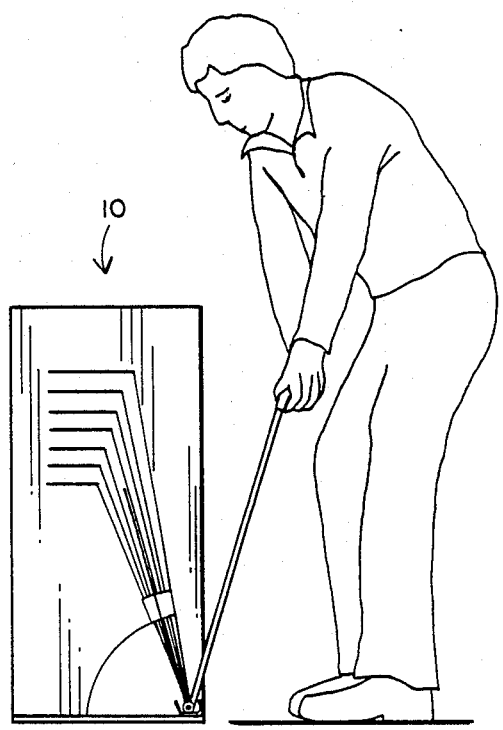
FIG. 5 is a schematic representation of the manner in which the apparatus of the present invention may be used by a golfer.

Although various indicia may be placed on the face 23 of the housing 22 to provide a convenient means for measuring the position of pointer 24 for each golfer, an examplary form of indicia 28 is illustrated therein. In the example illustrated in FIG. 4 it will be noted that the angular travel range of pointer 20 visible through window 30 has been segregated into seven equally spaced angular segments of 1 degree each from 57 to 63 degrees. The centrally located segment corresponds to an angle of 60 degrees which is the standard angular relationship between a golf club shaft and the underlying surface in a standard five iron when the sole is properly aligned parallel with the underlying surface. Thus, the indicia shown in FIG. 4 provides up to plus or minus 3 degrees variation between the conventional 60 degree configuration for a five iron in both the upper and lower direction to accommodate deviations from the 60 degree angle. It will be understood, of course, that the increments as well as the range of angular variation is a matter of design choice and may be varied considerably from that shown in FIG. 4 without deviating from the scope of the invention.

The operation of the measurement apparatus 10 of the present invention is carried out by having a golfer grasp the grip 13 of club simulation member 12 precisely in the same manner he would if he were grasping an actual golf club in position for addressing a golf ball. The hinge bracket 16 is readily rotated in elevation to permit the golfer to grasp the simulation member 12 in the most comfortable position for his particular arm length, height and other physical characteristics. As illustrated in FIG. 3, the club simulation member 12 may also be provided with a degree of lateral angular movability in order to provide the golfer with the most comfortable position. When the golfer has assumed that comfortable ball addressing position, pointer 20 registers with great accuracy the precise angle represented in FIG. 2, namely, the angle between the underlying surface and the golf club shaft. One exemplarly illustration of how the pointer might indicate such an angle is illustrated in FIG. 4 where in that particular example, the angle would be approximately 60 degrees as seen through transparent window 30 of face 23.

It will now be understood that what has been disclosed herein comprises a novel golf club measurement apparatus which employs a club simulation member terminating in a yoke attached to a hinged bracket also connected to a pointer which may be seen through a transparent face in an adjacent housing. The pointer and the simulation member are always at a fixed angle relative to one another whereby changes in elevation of the simulation member produce corresponding changes in the elevation angle of the pointer. The apparatus thereby permits reliable and expedient measurement of the angle between the golf club shaft and the underlying surface when the golfer has grasped the club simulation member in the same fashion that he would in addressing the ball while keeping the sole of the club head parallel to the underlying surface. As a result, slight variations in the angle between the club head and the shaft to accommodate people of non-average height, arm length and the like, may be easily and accurately measured without requiring inconvenient observation and/or measurement of the angle between the sole of the actual club and the underlying surface as would be required in the prior art.

Those having skill in the art to which the present invention pertains, will now as a result of the applicant's teaching herein, perceive various modifications and additions which may be made to the invention. By way of example, an angle indicator other than a straight line pointer may be utilized to provide a measurement of the angle of the club simulation member relative to the underlying surface when grasped by the golfer. Such an indicating device may be a pointer of another shape or dimension or for that matter, an electrical device such as an electrical readout connected to appropriate sensors measuring the aforementioned angle. Accordingly, all such modifications and additions are deemed to be within the scope of the invention which is to be limited only by the claims appended hereto.

I claim:

1. An apparatus for measuring the angle deviation from a standard elevation angle between a golf club shaft and the underlying surface in order to assure a parallel relation between the sole of the golf club head and the underlying surface when the club is grasped by a golfer in a ball-addressing position; the apparatus comprising:
   a golf club shaft simulation member having at least a portion of an actual club shaft with a grip end and an affixed end;
   a hinge member for rotation through an angle of pre-selected range, the affixed end of said simulation member being attached to said hinge members for rotation therewith;
   a pointer also attached to said hinge member for rotation therewith and extending from said hinge member at a selected angle relative to said simulation member whereby rotation of said simulation member produces corresponding rotation of said pointer;
   indicating means cooperating with said pointer for displaying the angle between said simulation member and the surface underlying said apparatus whereby said angle deviation may be measured; and
   a housing into which said pointer extends, said housing having a face of which at least a portion adjacent said pointer is transparent, said indicating means comprising indicia on said face adjacent said transparent portion.

2. An apparatus for measuring the angle deviation from a standard elevation angle between a golf club shaft and the underlying surface in order to assure a parallel relation between the sole of the golf club head and the underlying surface when the club is grasped by a golfer in a ball-addressing position; the apparatus comprising:
   a golf club shaft simulation member having at least a portion of an actual club shaft with a grip end and an affixed end;
   a hinge member for rotation through an angle of pre-selected range, the affixed end of said simulation member being attached to said hinge members for rotation therewith;
   a pointer also attached to said hinge member for rotation therewith and extending from said hinge member at a selected angle relative to said simulation member whereby rotation of said simulation member produces corresponding rotation of said pointer;
   indicating means cooperating with said pointer for displaying the angle between said simulation member and the surface underlying said apparatus whereby said angle deviation may be measured; and
   said simulation member having a yoke at said affixed end.

3. The apparatus recited in claim 1 further comprising a base to which said hinge member is attached, said base supporting said housing substantially perpendicular to said underlying surface.

4. The apparatus recited in claim 3 further comprising a limit bracket positioned between said hinge member and said base and having means for limiting said angle of pre-selected range of said hinge member.

5. An apparatus for indicating the angle at which a golfer holds a golf club shaft relative to the ground; the apparatus comprising:
   a simulated golf club shaft rotatably connected at one end for rotation in a vertical plane and a display member connected to said shaft and calibrated to display the angle of said shaft in said plane relative to the ground;
   said display member having a pointer configured in a fixed angular relation to said shaft;
   said display member also having angle indicating indicia; and
   a housing into which said pointer extends, said housing having a face of which at least a portion is transparent for permitting observation of said pointer.

6. The apparatus recited in claim 5 wherein said angle indicating indicia is located on said face.

* * * * *